3,542,735
Patented Nov. 24, 1970

3,542,735
METHOD OF PREPARING POLYIMIDES IN ALKANOIC ACIDS SOLVENTS
Eric Royle Lynch, Llangollen, Wales, assignor to Monsanto Chemicals Limited, London, England, a British company
No Drawing. Filed Apr. 10, 1968, Ser. No. 720,335
Claims priority, application Great Britain, Apr. 14, 1967, 17,269/67
Int. Cl. C08g 20/32
U.S. Cl. 260—47                   7 Claims

ABSTRACT OF THE DISCLOSURE

Process for making thermal and oxidation stable fluorine-containing polyimides by dehydrating a solution comprising an aromatic dianhydride and an aromatic diamine, the aromatic rings of either or both reactants being fluorinated, the solvent containing at least 40% by volume of an ether, ketone, or alkanoic acid or mixtures thereof, the remainder being an inert organic solvent.

---

The invention herein described was made in the course of or under a contract with the Department of the Air Force.

CROSS-REFERENCES TO RELATED APPLICATIONS

Our U.S. application Ser. No. 548,435, filed May 9, 1966, now abandoned describes and claims certain fluorine-containing polyimides. The preferred method disclosed in that specification for the production of the polyimides comprises forming, in a firts stage, a polyamic acid by the reaction of a dianhydride with a diamine in a polar solvent, and converting the polyamic acid to a polyimide by chemical or thermal dehydration.

SUMMARY OF THE INVENTION

This invention relates to a process for the production of polymeric materials, in particular to a process for the production of fluorine-containing polyimides.

We have now found that polyimides having improved properties, especially in respect of their thermo-oxidative stabilities, are produced by a modification of this process. The process of the present invention is one for the production of a fluorine-containing polyimide which comprises forming a solution of a dianhydride of the formula:

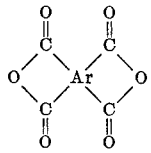

where Ar represents an aromatic structure comprising one or more aromatic nuclei, the two carbonyl groups in each anhydride grouping being linked to a corresponding pair of adjacent nuclear carbon atoms in the said structure, and a diamine having the formula $H_2N-R-NH_2$, where R represents an aromatic radical comprising one or more aromatic nuclei and each nitrogen atom is linked to a nuclear carbon atom of the said radical, and where there is present at least one fluorine atom as a nuclear substituent in the aromatic structure Ar or the aromatic radical R, in a solvent which contains at least 40% by volume of a compound that is a ketone, ether or alkanoic acid containing up to 6 carbon atoms per molecule or at least 40% by volume of a mixture of two or more such compounds, the balance if any being an inert organic liquid that is miscible with the compound or mixture under the reaction conditions, isolating an intermediate product from the solution, and dehydrating the intermediate product to form the polyimide. The preferred inert organic liquids are hydrocarbons, halogenated hydrocarbons and halocarbons.

The intermediate product can be isolated from the solution by evaporation of the solvent, usually under reduced pressure to avoid over-heating, or by the addition of an inert "non-solvent" so that the intermediate product is precipitated. In some instances, especially where the solvent contains a significant proportion of hydrocarbon, halogenated hydrocarbon or halocarbon, partial precipitation of the intermediate product from the solution may occur on standing.

Preferably the solvent used in the process contains at least 50% by volume of a ketone, ether, alkanoic acid or mixture of such compounds and it is often most convenient to use a solvent that is an ether, ketone or alkanoic acid substantially free from other inert organic liquids.

The nature of the intermediate product is uncertain and probably varies according, for example, to the particular starting materials employed, and according to the precise conditions under which the solution is formed and the intermediate product is isolated. Thus, spectroscopic evidence suggests that in certain cases the intermediate product may be a low molecular weight polyamic acid, while in others it appears to be a relatively loose association of the dianhydride and the diamine, possibly with the inclusion or occlusion of a proportion of the solvent.

The ethers that can be used as solvents in the production of the intermediate products may contain one or more ether groupings. The groups linked through oxygen in such compounds can be aliphatic or aromatic, but preferably at least one such group is aliphatic. Typical of such compounds are dialiphatic mono-ethers, in particular those where each aliphatic group is an alkyl or alkenyl group containing up to 12 carbon atoms, more especially dialkyl monoethers in which each alkyl group contains from 2 to 6 carbon atoms, for example diethyl and diisopropyl ether; aliphatic diethers, for instance dialkoxyalkanes, in particular those where the alkoxy groups and the alkane each contain up to 6 carbon atoms, for example 1,2 - dimethoxyethane, 1,2 - diethoxyethane, and 1,4 - dimethoxybutane; alkyl phenyl monoethers and alkyl alkylphenyl monoethers, in particular those where the alkyl group in an alkyl phenyl ether or each alkyl group in an alkyl alkylphenyl ether is selected from alkyl groups having up to 6 carbon atoms, for example anisole, phenetole, and methyl-p-tolyl ether; and dialkoxybenzenes where each alkoxy group contains up to 6 carbon atoms, for example resorcinol dimethyl ether and catechol diisobutyl ether.

Particularly suitable are ethers where the oxygen atom or each oxygen atom is a member of an alicyclic ring. Generally such ethers contain 5 to 6 atoms in the ring, and there may be present one or more alkyl substituents such that the total number of carbon atoms per molecule of ether is generally from 4 to 12. Examples of such ethers are tetrahydrofuran, 2-methyltetrahydrofuran, 3-methyltetrahydrofuran, 2,2-dimethyltetrahydrofuran, 2,2,5,5-tetramethyltetrahydrofuran, 2,3-dihydropyran, tetrahydropyran and dioxan.

Suitable ketonic solvents include dialiphatic ketones, for example dialiphatic ketones where each aliphatic group is selected from saturated and unsaturated hydrocarbon groups containing up to 12 carbon atoms, and more especially dialkyl ketones where each alkyl group contains up to 8 carbon atoms, for instance acetone, methyl ethyl ketone, methyl isobutyl ketone and ethyl hexyl ketone. Also suitable are cycloaliphatic ketones, for example cycloalkyl ketones containing 5 or 6 ring carbon atoms and a total of 5 to 10 carbon atoms per molecule, for instance cyclopentanone, cyclohexanone and the methylcyclohexanones.

Alkanoic acids that can be used as solvents or components of solvents include formic, acetic, propionic and butyric acids. Acetic acid is generally the most suitable of the alkanoic acids.

The inert organic liquids that can be used as components of the solvent in conjunction with an ether, ketone or alkanoic acid may either increase or decrease the solubility of the intermediate product in relation to its solubility in the ether, ketone, alkanoic acid or mixture of these compounds alone. The hydrocarbons, halogenated hydrocarbons and halocarbons referred to above are preferred because they tend to decrease the solubility of the intermediate and thus facilitate its isolation. Examples of hydrocarbons, halogenated hydrocarbons and halocarbons that can be used are alkanes containing from 5 to 12 carbon atoms per molecule and mixtures of such alkanes, chloroalkanes containing from 1 to 4 carbon atoms and from 1 to 6 chlorine atoms per molecule, for instance carbon tetrachloride, chloroform, 1,2-dichloroethane, trichloroethylene, and 1,1,2,2-tetrachloroethane. Also suitable are aromatic hydrocarbons and chlorohydrocarbons such as for example benzene, monochlorobenzene and toluene.

Hydrocarbons, halogenated hydrocarbons and halocarbons can also be used as "non-solvents" to precipitate an intermediate product that has been formed in a solvent in which it is soluble.

Inert organic liquids that tend to increase the solubility of the intermediate product in the solvent include the polar liquids exemplified in U.S. application Ser. No. 548,435, filed May 9, 1966.

In the polyimides produced according to the process of the invention, fluorine may be present in either the aromatic structure Ar or the radical R, or in both Ar and R, and where fluorine is present, the preferred structures and radicals are those that are fully fluorinated; R, for instance, can be a phenylene or fluorinated phenylene radical, and where it is a fluorinated phenylene radical, it is preferably a tetrafluorophenylene radical.

Isomeric variations are possible within the aromatic structure Ar and the radical R. Preferably, however, in the structure Ar and the pairs of carbon atoms to which the carbonyl groups are linked are not adjacent pairs in a single aromatic nucleus, and preferably in the radical R, the nuclear carbon atoms by which it is linked to the imide nitrogen atoms are not adjacent carbon atoms in a single aromatic nucleus.

In respect of the aromatic structure Ar, the polymers that are most readily accessible are usually those where Ar represents a benzene or fluorinated benzene nucleus, the corresponding starting materials in the process of the invention being pyromellitic anhydride and difluoropyromellitic anhydride. More generally, however, the class of polyimides includes members where Ar represents for instance an optionally fluorinated naphthalene nucleus or two optionally fluorinated benzene nuclei linked to each other directly or through an intermediate atom or group, for example an oxygen or sulphur atom, or an alkylene, carbonyl, or sulfonyl group. The corresponding starting materials include for instance 2,3,6,7-naphthalene tetracarboxylic dianhydride; 1,4,5,8-tetrafluoro-2,3,6,7-naphthalene tetracarboxylic dianhydride; 3,3',4,4'-biphenyl tetracarboxylic dianhydride; 2,2',5,5',6,6'-hexafluorodiphenyl ether 3,3',4,4'-tetracarboxylic dianhydride; 2,2',5,5',6,6'-hexafluorodiphenylmethane 3,3',4,4'-tetracarboxylic dianhydride; benzophenone 3,3',4,4'-tetracarboxylic dianhydride; 4,4',5,5',6,6'-hexafluorobenzophenone 2,2',3,3'-tetracarboxylic dianhydride; and 2,2',5,5',6,6'-hexafluorodiphenyl sulfone 3,3',4,4'-tetracarboxylic dianhydride.

In respect of the radical R, the polymers that are most readily accessible are usually those where R represents a benzene or fluorinated benzene nucleus or two directly-linked benzene or fluorinated benzene nuclei, the corresponding starting materials in the process of the invention being phenylenediamines, fluorinated phenylenediamines, diaminobiphenyls and fluorinated diaminobiphenyls. More generally, however, R can represent for instance a naphthalene or fluorine-containing naphthalene nucleus or two benzene or fluorine-containing benzene nuclei linked through an intermediate atom or group, for example an oxygen or sulfur atom, or an alkylene, carbonyl or sulfonyl group. Examples of the appropriate diamine starting materials are p-phenylenediamine; tetrafluoro-m-phenylenediamine; tetrafluoro - p - phenylenediamine; 3,3'-diamino-2,2',4,4',5,5',6,6'-octafluorobiphenyl; 4,4'-diamino-2,2',3,3',5,5',6,6'-octafluorobiphenyl; 4,4'-diaminodiphenyl ether; 4,4'-diamino-2,2',3,3',5,5',6,6'-octafluorodiphenylether; and 4,4'-diamino-2,2',3,3',5,5',6,6'-octafluorodiphenylmethane.

The polyimide chains are terminated by amino or anhydride groupings or in certain modified polymers, by monovalent groups, usually monovalent aromatic or fluorinated aromatic groups.

Equimolar quantities of the dianhydride and diamine reactants or quantities that are substantially so are normally employed. The reaction temperature of the solution during the production of the intermediate product is preferably maintained below 120° C., and more preferably is within the range 10° C. to 90° C. The required quantities of the reactant may be mixed relatively quickly and the mixture then held at an appropriate temperature for a sufficient time to effect the required condensation, or a portion of one reactant, for instance the dianhydride, may be withheld from the initial mixing and added gradually to the reaction mixture over an extended period.

Dehydration of the polyamic acid can be effected by heating the intermediate product alone or in a high boiling point inert liquid for instance a chlorinated biphenyl, in the presence of a dehydrating agent, for example an aliphatic acid anhydride, or in the presence of a base, for example a tertiary amine, which catalyses the cyclodehydration process. To convert the intermediate product to a polyimide by thermal dehydration either alone or in a high-boiling liquid, it is usually necessary to heat the intermediate product at a temperature above 200° C., for example in the range 250–450° C. Temperatures in the range 300–425° C. are preferred where the intermediate is heated alone. The intermediate product can be heated under atmospheric conditions, but heating in a forced draft oven or under reduced pressure is generally more satisfactory.

The polyimides produced by the process of the present invention can be formed into shaped articles having good mechanical strength by coalescing or sintering the polyimide in finely-divided form under pressure at an elevated temperature.

DESCRIPTION OF THE PREFERRED EMBODIMENTS

Example 1

A solution of 4.5 grams of tetrafluoro-m-phenylene diamine in 10 cc. of tetrahydrofuran was added to a solution of 5.45 grams of pure pyromellitic dianhydride in 115 cc. of tetrahydrofuran. The diamine solution was transferred quantitatively by means of a further small quantity of solvent. The bulk of the solvent was distilled from this solution under reduced pressure, maintaining the solution at 50° C. The residue was dried at 50° C. at a pressure of 0.1 mm. of mercury for 6 hours, but still retained solvent.

A sample of the intermediate product thus obtained lost 24% of its weight on heating to 400° C. in air over one hour. The product formed was a polyimide as shown by the infra-red spectrum and its general insolubility. Heating this polyimide at 400° C. in air caused an 8% loss in weight over 48 hours, i.e., an average hourly weight loss over this period of 0.167%.

A sample of poly[(tetrafluoro-m-phenylene)pyromellitimide] prepared as described in Example 1 of U.S. application Ser. No. 548,435 had an average hourly weight loss in air at 400° C. of 0.79%.

Example 2

9.0 grams of tetrafluoro-m-phenylenediamine were added as a powder to a solution of 10.9 grams of commercial pyromellitic dianhydride in 230 cc. of tetrahydrofuran. The diamine was transferred quantitatively, using a small quantity of solvent to wash all the powder into the anhydride solution. The bulk of the solvent was distilled under reduced pressure from the solution at 30° C. and the pale yellow residue was further dried at 56° C. at a pressure of 0.1 mm. of mercury for several hours. The intermediate product, 21.8 grams by weight, retained solvent after this drying.

When heated to 400° C. in air over a period of one hour there was a 25% loss in weight to yield polyimide, a sample of which when maintained at 400° C. for 24 hours in air, lost 10% of its weight.

A further sample of the intermediate product was converted to a polyimide by heating at 330° C. for one hour and at 350° C. for 2 hours. 1.8 grams of this polyimide were ground to a powder and pressed in a 1 inch diameter mold at 2000 p.s.i. The temperature was raised to 400° C. over 20 minutes, and maintained at 400° C. for 5 minutes. The pressure was briefly increased to 20,000 p.s.i., and then released. The disc of polyimide removed from the mold after cooling had a thickness of 0.09 inch, a density of 1.5 grams per cc. and a high resistance to fracture.

Example 3

27.0 grams of tetrafluoro-m-phenylene diamine were added as a powder to a solution of 32.7 grams of commercial pyromellitic dianhydride in 600 cc. of acetone stirred at room temperature. The acetone was distilled from this solution at 22° C. under reduced pressure, and the residue was further dried 56° C. at a pressure of 0.1 mm. of mercury for several hours. After this drying, the complex still retained solvent.

A sample heated to 400° C. in air over a period of one hour lost 22% in weight to yield a polyimide. A sample of this polyimide maintained at 400° C. for 24 hours in air lost 10% of its weight.

Example 4

This example described the production of a polyimide from pyromellitic dianhydride and tetrafluoro-p-phenylenediamine.

A solution of 0.9 gram (0.005 mole) of tetrafluoro-p-phenylenediamine in 5 cc. of tetrahydrofuran was transferred quantitatively, using an additional 4 cc. of solvent, to a solution of 1.09 grams (0.005 mole) of pyromellitic dianhydride in 16 cc. of warm tetrahydrofuran. After standing for several hours, the bulk of the solvent was removed by evaporation under reduced pressure at a temperature of 18–20° C. The solid residue was held at 50–55° C. at a pressure of 0.1 mm. of mercury for 4 hours and the complex thus obtained was heated in air at a rate giving a temperature rise of 1° C. per minute. During 4½ hours (up to a temperature of 270° C.) the material lost weight relatively rapidly, the weight of the material at the end of this time being 73% of its initial weight. Thereafter, the rate of weight loss became slower until the temperature reached approximately 450° C., when an acceleration of weight loss was observed. The amount of weight loss up to 270° C. and the relative thermal stability of the material between 270° C. and 450° C. was consistent with the formation of a polyimide.

Example 5

This example describes the production of a polyimide from pyromellitic dianhydride and octafluorobenzidine.

A solution of 1.64 grams (0.005 mole) of octafluorobenzidine in 5 cc. of tetrahydrofuran was transferred quantitatively, using an additional 4 cc. of tetrahydrofuran, to a solution of 1.09 grams (0.005 mole) of pyromellitic dianhydride in 16 cc. of warm tetrahydrofuran. A solid intermediate product was isolated from this solution in essentially the same way as in the previous example. The rates of weight loss on subjecting the intermediate to a gradually increasing temperature were consistent with the existence of a stable polyimide at temperatures in the range 300 to 450° C.

Example 6

This example describes a process in which a non-solvent was employed to precipitate the intermediate product from the solution in which it was formed.

27.0 grams of tetrafluoro-m-phenylene diamine were added as a powder to a solution of 32.7 grams of pyromellitic dianhydride in 620 cc. of tetrahydrofuran stirred at room temperature. After two hours about ¾ of the volume of solvent was distilled off under reduced pressure with the solution in a bath at 50° C. The warm residual solution was added to 620 cc. of carbon tetrachloride stirred at room temperature. The finely divided cream colored precipitate was collected by filtration, washed with carbon tetrachloride, and dried at 56° C./0.2 mm. of mercury for eighteen hours. This treatment did not completely remove solvent from the product, which weighed 57 grams after drying.

A sample of this product lost 18.5% of its weight on heating to 400° C. in air over one hour. The product formed was a polyimide as shown by its infra-red spectrum and its general insolubility. Heating this polyimide in air at 400° C. caused a 7.7% loss in weight over 48 hours.

The hydrogenic analogue of this polyimide prepared by a similar method from m-phenylene diamine and pyromellitic dianhydride, showed a weight loss of 11% on heating in air at 400° C. for 48 hours.

Example 7

This example describes the production of a polyimide from the reaction of pyromellitic dianhydride and tetrafluoro-m-phenylene diamine in a tetrahydrofuran/carbon tetrachloride solution.

27 grams of tetrafluoro-m-phenylene diamine were added to a stirred solution of 32.7 grams of pyromellitic dianhydride in 750 cc. of anhydrous tetrahydrofuran at 20° C. followed by 750 cc. of anhydrous carbon tetrachloride. A small amount of pyromellitic dianhydride was thrown out of solution, but this redissolved after stirring for about 2 hours. Several hours later, a further precipitate began to form, and after stirring overnight, the precipitate was collected by filtration and washed with three portions of carbon tetrachloride. The yield was 47.8 grams. A further 10.9 grams of this intermediate product were isolated from the filtrate by adding the carbon tetrachloride wash liquor.

2.5 grams of the intermediate product were stirred into 25 cc. of chlorinated biphenyl containing approximately 42% by weight of chlorine at 250° C. (±3° C.) for 2 hours to yield a turbid solution, whilst water was evolved. 50 cc. of carbon tetrachloride were added to the cooled solution to yield a finely divided precipitate which was collected by filtration, washed with carbon tetrachloride and dried at 100° C. and 0.2 mm. pressure for a period of 8 hours. The yield of polyimide was 1.9 grams.

Example 8

This example describes the production of a polyimide from the reaction of pyromellitic dianhydride and tetrafluoro-m-phenylene diamine in glacial acetic acid solution.

1.8 grams of tetrafluoro-m-phenylene diamine were added to a hot stirred solution of 2.18 grams of pyromellitic dianhydride in 50 cc. of glacial acetic acid and the solution was stirred at the boil, under reflux, for six hours. Early in this period a precipitate started to form. The mixture was allowed to cool, and the precipitate was collected by filtration, washed with water, and dried for several hours at 56° C. and 0.2 mm. pressure, to yield a product of 0.15 dl./g. inherent viscosity, determined from a 0.5% solution in dimethyl sulfoxide. Thermogravimetric analysis showed that this product was already largely polyimide and the conversion was completed by heating in a forced draft oven.

It is to be understood that although the invention has been described with specific reference to particular embodiments thereof, it is not to be so limited since changes and alterations therein may be made which are within the full intended scope of this invention as defined by the appended claims.

What I claim is:

1. A process for the production of a fluorine-containing polyimide, which comprises forming a solution of a dianhydride of the formula

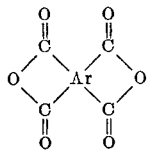

where Ar represents an aromatic structure comprising one or more aromatic nuclei, the two carbonyl groups in each anhydride groupings being linked to a corresponding pair of adjacent nuclear carbon atoms in the said structure, and a diamine having the formula

H₂N—R—NH₂ where R represents an aromatic radical comprising one or more aromatic nuclei and each nitrogen atom is linked to a nuclear carbon atom of the said radical, and where there is present at least one fluorine atom as a nuclear substituent in the aromatic structure Ar or in the aromatic radical R, in a solvent that contains at least 40% by volume of an alkanoic acid containing up to 6 carbon atoms per molecule, the balance if any being an inert organic liquid that is a hydrocarbon, halogenated hydrocarbon or halocarbon or a mixture of compounds selected from hydrocarbons, halogenated hydrocarbons and halocarbons, isolating an intermediate product from the solution, and dehydrating the intermediate product to form the polyimide.

2. A process according to claim 1, in which Ar in the formula of the dianhydride represents a benzene or fluorinated benzene nucleus, a naphthalene or fluororinated naphthalene nucleus or two optionally fluorinated benzene nuclei linked directly or through an oxygen or sulfur atom or through an alkylene, carbonyl or sulfonyl group, and the pairs of carbon atoms in Ar to which the carbonyl groups are linked are not adjacent pairs in a single aromatic nucleus.

3. A process according to claim 1, in which R in the formula of the diamine represents a benzene or fluorinated benzene nucleus, a naphthalene or fluorinated naphthalene nucleus or two optionally fluorinated benzene nuclei linked directly or through an oxygen or sulfur atom or through an alkylene, carbonyl or sulfonyl group, and the nuclear carbon atoms to which the amino groups are linked are not adjacent carbon atoms in a single aromatic nucleus.

4. A process according to claim 1, in which the dianhydride and diamine are such that any aromatic nucleus in the dianhydride or diamine that contains fluorine is fully fluorinated.

5. A process according to claim 1, in which the solution is formed and the intermediate product is isolated at a temperature below 120° C.

6. A process according to claim 1, in which the solvent is acetic acid.

7. A process according to claim 1, in which the solvent contains a balance of an inert organic liquid, characterized in that the inert organic liquid is carbon tetrachloride.

References Cited

UNITED STATES PATENTS

| 3,271,366 | 9/1966  | Kreuz    | 260—47   |
| 3,282,897 | 11/1966 | Angelo   | 260—47   |
| 3,342,774 | 9/1967  | Hoegger  | 260—47   |
| 3,349,061 | 10/1967 | Pruckmayr| 260—47   |
| 3,422,064 | 1/1969  | Gall     | 260—47   |
| 3,441,532 | 4/1969  | Victorius| 260—30.4 |

FOREIGN PATENTS 6704840  10/1967  Netherlands.

WILLIAM H. SHORT, Primary Examiner

L. L. LEE, Assistant Examiner

U.S. Cl. X.R.

260—30.4, 31.2, 32.8, 33.2, 65, 78